Patented Aug. 29, 1950

2,520,339

UNITED STATES PATENT OFFICE 2,520,339

ARALIPHATIC AZO CATALYSTS FOR ADDITION POLYMERIZATION

James A. Robertson, Wilmington, Del., assignor to E. I. du Pont de Nemours & Company, Wilmington, Del., a corporation of Delaware No Drawing. Application April 13, 1948, Serial No. 20,849

15 Claims. (Cl. 260—80)

This invention relates to addition polymerization and more particularly to new catalysts therefor.

Various catalysts have been proposed for addition polymerization, i. e., the polymerization of polymerizable ethylenically unsaturated monomers. These catalysts suffer from various defects. Thus peroxy compounds may tend to oxidize the polymer as formed and may alter the color thereof or of dyestuffs contained in the polymerization mixture. Certain azo compounds having a nitrile or related group on the carbon attached to the azo group (Hunt, Serial No. 2,551 of January 15, 1948, and now U. S. Patent 2,471,959) are of use in addition polymerization but suffer from diminished activity at temperatures above 150° C. and even above 100° C. Other azo compounds such as phenylazotriphenylmethane [Schulz, Z. Elektrochem. 47, 272 (1941)] give but low yields of polymer.

This invention has as an object the preparation of addition polymerization catalysts having a wide temperature range of effectiveness. A further object is an improved polymerization process. Other objects will appear hereinafter.

These objects are accomplished by the improvement in addition polymerization processes wherein there are employed, as catalysts for the addition polymerization, araliphatic azo compounds of the formula Ar—CHR—N=N—CHR—Ar wherein Ar is an aromatic radical and preferably an aryl radical and R is a hydrocarbon radical of one to ten carbons.

These compounds are effective over a wide temperature range, e. g., 60–250° C.

The following examples in which the parts given are by weight unless otherwise specified further illustrate the preparation and use of the compounds in polymerization.

Example I

Acetophenone azine (70.8 parts), prepared by the reaction of acetophenone and hydrazine as described by Knopfer, Monatsch. 30, 36 (1909), was dissolved in about 240 parts of ethanol and placed in a pressure resistant vessel. A total of 3.6 parts of palladium on charcoal (10% Pd) was added, the vessel closed and heated at 50–60° C. for 1½ hours under hydrogen pressure within the range of 1000–1500 lbs./sq. in. The hydrazo compound (boiling at 141–142° C. at 2–3 mm.) was obtained in a 90% yield.

A total of 24 parts of the hydrazo compound, ($C_6H_5CHCH_3NH$—)$_2$, was dissolved in 200 parts of n-heptane and oxygen gas bubbled through the solution until the temperature stopped rising (about four hours). The solution was dried over magnesium sulfate and the heptane removed by evaporation. Crystallization of the crude azo material gave a 72% yield of 1,1'-azobis(1-phenylethane), ($C_6H_5CHCH_3$—N=)$_2$, which melted at 72° C. The analysis for this compound was: Calculated for $C_{16}H_{18}N_2$: C, 80.6; H, 7.6; N, 11.8. Found: C, 81.2; H, 7.9; N, 12.7. Ultraviolet absorption spectra indicated the presence of the azo group.

Example II

In a manner similar to that of Example I, benzophenone was converted to the azine as described by Curtis et al., J. fur Praktische Chemie 44, 194 (1891), which was hydrogenated in dioxane solution to give the corresponding hydrazo compound melting at 73–76° C. in 62% yield. This hydrazo compound was oxidized in benzene solution with air to give about a 20% yield of azobis(diphenylmethane) which melted at 86° C.

Example III

In a series of pressure resistant stainless steel vessels capable of holding 400 parts of water there were placed about 80 parts of benzene and 0.1 part of catalyst. The air was flushed from the vessels by nitrogen and ethylene introduced. During the polymerization time (about 10 hours) the ethylene was maintained at a pressure of about 900 atmospheres. The following table shows the yields of ethylene polymer obtained at various temperatures with various catalysts.

| Catalyst | Temperature, °C. | Yield, Parts |
|---|---|---|
| 1,1'-Azobis(1-phenylethane)  | 100 | 15 |
| Do | 150 | 31 |
| Do | 175 | 45 |
| Do | 200 | 59 |
| Azobis(diphenylmethane) | 100 | 1.5 |
| Do | 150 | 11.5 |
| Do | 175 | 17.2 |

In contrast with the results of the above experiment, when phenylazotriphenylmethane was used as the catalyst at 100° C., no polymer was obtained while at 150° C., only 3.2 parts were obtained.

Example IV

In a pressure resistant glass vessel were placed 21.2 parts of acrylonitrile, about 80 parts of cyclohexane, and 0.19 part of 1,1'-azobis(1-phenylethane). After heating at 60° C. for 24 hours there was obtained a 24% conversion of acrylonitrile having an intrinsic viscosity, measured in dimethylformamide, of 1.487.

*Example V*

When the general procedure of Example IV was repeated except that 0.29 part of azobis (diphenylmethane) was employed as the catalyst and the time of polymerization was 3.5 hours, there was obtained a 66% yield of polymeric acrylonitrile. When 0.32 part phenylazotriphenylmethane was used as the catalyst under these conditions, no polymer was obtained.

The azo catalysts employed in the process of this invention have the general formula

in which Ar is an aromatic radical and R is a hydrocarbon radical of 1–10 carbons. Generally the aromatic monovalent radical Ar has from 6–12 carbons and is preferably hydrocarbon and generally phenyl. The hydrocarbon radical R may be aliphatic, cycloaliphatic, or aromatic.

Examples of azo catalysts that may be used in the process of this invention in addition to those disclosed in the examples are 1,1'-azobis(1-phenylhexane), azobis(naphthylcyclohexylmethane). Nuclearly substituted aryl radicals may be present, e. g., tolyl, methoxyphenyl or chlorophenyl or other alkyl, alkoxy and halogen substituted aryl radicals.

The compounds are readily prepared in the manner described in the examples, i. e., by the reaction of the ketone, e. g., valerophenone, 1-, and 2-naphthyl cyclohexyl ketone, o-, m-, and p-methoxyacetophenone, o-, m-, and p-chloroacetophenone, and o-, m-, and p-chlorobenzophenone with hydrazine followed by reduction of the hydrazo compound and oxidation to the desired azo compound.

The preferred catalysts are those having attached to each of the azo nitrogens, hydrocarbon radicals having a total of 8 to 13 carbons.

The azo compounds above described are of generic utility in the polymerization of polymerizable compounds having ethylenic unsaturation, preferably polymerizable vinylidene compounds, i. e., compounds having at least one $CH_2=C<$ group, including olefins such as ethylene and propylene; acrylyl and alkacrylyl compounds, e. g., acrylonitrile, methacrylamide, acrylic acid, methyl methacrylate; vinyl and vinylidene halides, e. g., vinyl chloride, vinylidene fluoride; vinyl carboxylates, e. g., vinyl acetate; vinylpyridine; polyfluoroethylenes; dienes, such as chlorobutadiene; ethylene glycol dimethacrylates; diallyl adipate, and the copolymerization of such compounds with each other or with other compounds such as fumaric or maleic esters, etc.

The optimum conditions of polymerization will vary from monomer to monomer and azo compound to azo compound. Thus gases such as ethylene and propylene normally require pressure whereas pressure is not essential for monomers which are normally liquid under the reaction conditions since liquid phase conditions are preferred.

The polymerizations usually are carried out at temperatures of 50–250° C. and preferably of from 60–200° C. The amount of azo catalyst employed is generally 0.1 to 3% but may vary 0.05–5% based on the weight of polymerizable monomer.

The catalysts of this invention are advantageous over peroxy type catalysts in that they are devoid of oxidizing residues and do not tend to alter the color of the polymer, added dyestuffs or cross-link the polymer as formed. The catalysts of this invention have an unusually wide range of sustained catalytic activity and are particularly preferred for use in continuous polymerization processes.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition polymerization of polymerizable ethylenically unsaturated compounds, the improvement wherein the polymerization is effected by bringing said compound in contact with an azo compound

wherein Ar is a monovalent aromatic radical in which the free valence is attached to the aromatic ring and R is a hydrocarbon radical of one to ten carbons.

2. A composition comprising a polymerizable ethylenically unsaturated compound and, as a catalyst of the polymerization therefor, from 0.05 to 5%, by weight of said compound, of an azo compound

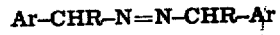

wherein Ar is a monovalent aromatic radical in which the free valence is attached to the aromatic ring and R is a hydrocarbon radical of one to ten carbons.

3. In the polymerization of ethylene, the improvement wherein the ethylene is polymerized in contact with an azo compound

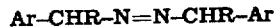

wherein Ar is a monovalent aromatic radical in which the free valence is attached to the aromatic ring and R is a hydrocarbon radical of one to ten carbons.

4. In the addition polymerization of polymerizable ethylenically unsaturated compounds, the improvement wherein said compound is polymerized in contact with 1,1'-azobis(1-phenylethane).

5. In the polymerization of ethylene, the improvement wherein the ethylene is polymerized in contact with 1,1'-azobis(1-phenylethane).

6. In the addition polymerization of polymerizable ethylenically unsaturated compounds, the improvement wherein said compound is polymerized in contact with azobis(diphenylmethane).

7. In the polymerization of ethylene, the improvement wherein the ethylene is polymerized in contact with azobis(diphenylmethane).

8. In the addition polymerization of polymerizable ethylenically unsaturated compounds, the improvement wherein the polymerization is effected by bringing said compound in contact with an azo compound wherein the two valences of the acyclic azo group are satisfied by monovalent hydrocarbon radicals wherein the free valence stems from an acyclic carbon which further bears one hydrogen atom and two monovalent hydrocarbon radicals one of which is an aryl radical and the other of which has from one to ten carbons.

9. In the addition polymerization of polymerizable ethylenically unsaturated compounds, the improvement wherein the polymerization is effected by bringing said compound in contact with an azo compound wherein the two valences of the acyclic azo group are satisfied by monovalent hydrocarbon radicals wherein the free valence stems from an acyclic carbon which further bears one hydrogen atom, an aryl radical, and an alkyl radical of one to ten carbons.

10. In the addition polymerization of polymerizable ethylenically unsaturated compounds, the improvement wherein the polymerization is effected by bringing said compound in contact with an azo compound wherein the two valences of the acyclic azo group are satisfied by monovalent hydrocarbon radicals of eight to thirteen carbons wherein the free valence stems from an acyclic carbon which further bears one hydrogen atom and two monovalent hydrocarbon radicals one of which is an aryl radical.

11. A composition comprising a polymerizable ethylenically unsaturated compound and, as a catalyst of the polymerization thereof, from 0.05 to 5%, by weight of said compound, of an azo compound wherein the two valences of the acyclic azo group are satisfied by monovalent hydrocarbon radicals wherein the free valence stems from an acyclic carbon which further bears one hydrogen atom and two monovalent hydrocarbon radicals one of which is an aryl radical and the other of which has from one to ten carbons.

12. A composition comprising a polymerizable ethylenically unsaturated compound and, as a catalyst of the polymerization thereof, from 0.05 to 5%, by weight of said compound, of an azo compound wherein the two valences of the acyclic azo group are satisfied by monovalent hydrocarbon radicals wherein the free valence stems from an acyclic carbon which further bears one hydrogen atom, an aryl radical, and an alkyl radical of one to ten carbons.

13. A composition comprising a polymerizable ethylenically unsaturated compound and, as a catalyst of the polymerization thereof, from 0.05 to 5%, by weight of said compound, of an azo compound wherein the two valences of the acyclic azo group are satisfied by monovalent hydrocarbon radicals of eight to thirteen carbons wherein the free valence stems from an acyclic carbon which further bears one hydrogen atom and two monovalent hydrocarbon radicals one of which is an aryl radical.

14. A composition comprising a polymerizable ethylenically unsaturated compound and, as a catalyst of the polymerization thereof, from 0.05 to 5%, by weight of said compound, of an azo compound wherein the two valences of the acyclic azo group are satisfied by monovalent hydrocarbon radicals wherein the free valence stems from an acyclic carbon which further bears one hydrogen atom and two aryl radicals of not more than ten carbons.

15. In the polymerization of ethylene, the improvement wherein the ethylene is polymerized in contact with an azo compound wherein the two valences of the acyclic azo group are satisfied by monovalent hydrocarbon radicals wherein the free valence stems from an acyclic carbon which further bears one hydrogen atom and two monovalent hydrocarbon radicals one of which is an aryl radical and the other is of not more than ten carbons.

JAMES A. ROBERTSON.

No references cited.